(12) United States Patent
Brouwer

(10) Patent No.: US 7,445,190 B2
(45) Date of Patent: Nov. 4, 2008

(54) MIRROR ADJUSTMENT MECHANISM, WING MIRROR UNIT AND METHOD

(75) Inventor: Stefan Frits Brouwer, Schoonhoven (NL)

(73) Assignee: MCi (Mirror Controls International) Netherlands B.V. (NL)

( * ) Notice: Subject to any disclaimer, the term of this patent is extended or adjusted under 35 U.S.C. 154(b) by 0 days.

(21) Appl. No.: 11/506,576

(22) Filed: Aug. 18, 2006

(65) Prior Publication Data

US 2007/0047116 A1 Mar. 1, 2007

Related U.S. Application Data

(63) Continuation of application No. PCT/NL2005/000126, filed on Feb. 21, 2005.

(51) Int. Cl.
*A47F 1/14* (2006.01)
*A47G 1/16* (2006.01)
*B60R 1/02* (2006.01)

(52) U.S. Cl. ............... 248/466; 248/475.1; 248/476; 359/874; 359/877

(58) Field of Classification Search ............ 359/877, 359/874, 876, 843, 872; 248/466, 475.1, 248/476, 478, 479, 480
See application file for complete search history.

(56) References Cited

U.S. PATENT DOCUMENTS 4,981,349 A 1/1991 Tamiya et al.
7,134,672 B2 * 11/2006 Beishline et al. ......... 280/5.502
7,137,717 B2 * 11/2006 Ohashi ..................... 359/877
7,172,298 B2 * 2/2007 Olijnyk et al. ............ 359/841

FOREIGN PATENT DOCUMENTS

EP 0 798 163 A2 10/1997

OTHER PUBLICATIONS

International Preliminary Report on Patentability for App. No. PCT/NL2005/000126 Issued Aug. 22, 2006.
International Search Report for App. No. PCT/NL2005/000126 Mailed May 30, 2005.
Patent Abstracts of Japan— JP 08 119037 Published May 14, 1996.
Patent Abstracts of Japan—JP 01 022646 Published Jan. 25, 1989.

* cited by examiner

*Primary Examiner*—Amy J. Sterling
(74) *Attorney, Agent, or Firm*—Dykema Gossett PLLC

(57) ABSTRACT

A mirror adjustment mechanism for adjusting a mirror housing including an actuator housing and a drive mechanism arranged in the actuator housing. The drive mechanism includes an electric motor including an output shaft; a drive train having an input part coupled to the output shaft; and an output part coupled to a driven part. The driven part is connected to an electrical circuit and is configured to be movable under a spring action relative to the actuator housing. The driving part controls the electric motor and includes a first contact part that cooperates with a second contact part fixedly arranged relative to the actuator housing. The driving part is movable between a first position in which the impedance between the first and second contact parts has a first value, and a second position in which the impedance between the first and second contact parts has a second value.

19 Claims, 6 Drawing Sheets

MIRROR ADJUSTMENT MECHANISM, WING MIRROR UNIT AND METHOD

CROSS-REFERENCE TO RELATED APPLICATION

This application is a continuation of International PCT Application No. PCT/NL2005/000126, with an international filing date of Feb. 21, 2005, which claims the benefit of priority to Netherlands Application No. 1025524, filed Feb. 19, 2004, each of which applications are fully incorporated herein by reference.

TECHNICAL FIELD

The invention relates to a mirror adjustment mechanism for adjusting a mirror housing of a motor vehicle.

BACKGROUND AND SUMMARY

The invention includes a drive mechanism arranged in an actuator housing. The drive mechanism comprises an electric motor and a drive train, an input part of the drive train being coupled to the output shaft of the electric motor, and an output part of the drive train being coupled to a driven part.

Such a mirror adjustment mechanism is known from, for instance, patent publication EP 0 675 817, in which a first actuator part is attached, by means of a friction coupling, to a base plate which is fixed relative to the bodywork of the motor vehicle, while a second actuator part forms the driven part to which the output part of the drive train is coupled. By activating the electric motor, the second actuator part pivots relative to the first actuator part, so that the mirror housing, which is attached to the second actuator part, is adjusted. Accordingly, from the driver's space, the user of the motor vehicle can have the mirror housing fold in or fold out between an operative position, in which the mirror housing is oriented substantially transversely to the bodywork, and a folded-in position, in which the mirror housing is oriented rearwards and alongside the bodywork. For instance during parking maneuvers, the driver can then, for the purpose of reducing the width of the vehicle, bring the mirror housing from an operative position to a folded-in position. During the electrical adjustment of the mirror housing, the position of the first actuator part can remain unchanged relative to the base plate. Upon reaching an end position, such as an operative position or a folded-in position, the mirror housing cannot pivot any further relative to the bodywork.

In order to force a pivoting movement between the first and second actuator part, the electric motor in this situation overcomes a frictional force of a friction coupling, so that the first actuator part starts to pivot relative to the base plate. After pivoting through a select or predetermined angle, the electric motor is switched off in that an electrode structure provided between the first actuator part and the base plate breaks an electrical connection between the electric motor and an electrical supply.

To improve the reliability of operation of the friction coupling, the coupling may be provided with a lubricant, such as for instance grease. However, since electrical circuits are present in the proximity of the coupling, use of the lubricant is undesired. Moreover, when lubricant comes into contact with the electrical circuits, it is not inconceivable that, as a consequence, the circuits function less well or even do not function at all anymore. Further, the operation of friction couplings at low temperatures is not properly guaranteed. Moreover, in certain situations, the electrode structure between the first actuator part and the base plate entails a complex succession of switch control operations of the electric motor, for instance when the mirror housing has been manually brought from the folded-in position to the operative position.

An object of the invention is to provide a mirror adjustment mechanism of the type mentioned in the opening paragraph hereof, in which some or all of the challenges mentioned are avoided while maintaining advantages. An object of the invention is to obtain a mirror adjustment mechanism with which the electric motor is switched off when an end position is reached, without the use of a friction coupling. To that end, the drive mechanism includes a driving part connected to an electrical circuit, arranged so as to be movable under spring action relative to the actuator housing, while the driving part, for controlling the electric motor, further comprises at least one first electrical contact part which cooperates with at least one second, corresponding contact part fixedly arranged with respect to the actuator housing and connected to the electrical circuit, the driving part being movable between a first position in which the impedance between the first and second contact parts has a first value, and a second position in which the impedance between the first and second contact parts has a second value.

What may be achieved by moving, upon the end position being reached, the driving part included in the drive train against a spring action relative to the actuator housing, and thereby varying the electrical impedance between the first contact part connected to the driving part and the second contact part arranged fixedly with respect to the actuator housing, is that the impedance between the electrical circuit and the first contact part varies when the mirror housing reaches the end position. Through variation of the electrical impedance, the electric motor can be switched off without performing or requiring additional switching operations.

What can be further achieved is that, by moving the driving part against a spring action, a spring force is exerted on the driving part and hence also on the drive train in which the driving part is included, thereby preventing displacements of the drive train and the driven part coupled thereto. The driven part can be formed, for instance, by the mirror housing or by a part which cooperates with parts connected fixedly to the bodywork of the vehicle, such as, for instance, a pivot. In both embodiments, movements of the mirror housing, such as shocks and vibrations, are counteracted by this spring force.

Also when external forces are exerted during adjustment of the mirror housing, the electric motor will be switched off as a result of displacement of the driving part relative to the actuator housing. This occurs, for instance, when the mirror housing is blocked by an object outside the vehicle, for instance a pillar.

An additional potential advantage of moving the driving part against a spring action is that when the mirror housing is adjusted from the end position or a blocked position the electric motor does not need to produce any additional energy to disenable any clamping coupling that may be present. This lowers requirements regarding the power to be produced by the electric motor at the beginning of an adjusting movement. The beginning of the movement to be performed by the mirror housing will be induced by the power produced by the energized electric motor, but additionally so by the spring action.

What is achieved by attaching the driving part to the actuator housing with at least one spring element, is that movement of the driving part only occurs when the force that is to be produced to adjust the mirror housing is greater than the force for moving the slide against the spring action.

When the electric motor is switched off, the mirror housing can then be secured in the end position with a spring force which is at the least equal to the bias of the spring element.

The driving part may be included in the drive train, so that the mirror housing has some clearance when a self locking electric motor is used. If clearance is not desired, it may be elected to include the driving part in the electric motor, so that the user of the motor vehicle, by exerting forces on the mirror housing, cannot feel any clearance resulting from the moveably arranged driving part.

In an embodiment, the driving part comprises a slide which cooperates with a driving element. In this way, movements of the driving part are uncoupled into, on the one hand, rotations or translations forming part of movements of the drive train that occur during normal use when adjusting the mirror housing and, on the other hand, the movement of the driving part when reaching the end position. Such uncoupling enables the slide and the drive element to be optimized each separately for their specific function.

What is achieved by designing the slide to be movable along a guide path, is that the sliding movement may be better defined in a properly reproducible manner, which can be beneficial to the reliability of the mirror adjustment mechanism.

It is noted that the Japanese patent publication JP 1 022 646 describes a mirror adjustment mechanism for adjusting a mirror housing which has a driving part which is arranged so as to be movable under spring action relative to an actuator housing. Upon the mirror housing reaching an end position, the driving part moves against the spring action, so that the motor of the mirror adjustment mechanism is cut off. The driving part is arranged between two helical springs.

Furthermore, it is noted that the Japanese patent publication JP 8 119 037 describes a similar mirror adjustment mechanism, with a driving part arranged between two helical springs.

In an embodiment according to the invention, the driving element is rotatably bearing mounted in the slide. As a result, an elegant, robust coupling is obtained between, on the one hand, the driving element which during normal operation performs a rotating movement and, on the other hand, the moving slide.

The first and second contact parts in the first position can jointly form an electrical connection, so that the impedance is low, and in the second position form an open pair of terminals, so that the impedance is high. What is thereby achieved is that a displacement of the driving part has as a result of an electrical connection between the first and second contact parts is broken or, conversely, established. In this way, the electric motor can be switched off. By connecting the electrical circuit, to which the second contact part is connected, directly with an electrical supply, the electric motor can be switched off directly upon movement of the driving part. By including a separate control circuit in the electrical circuit, the motor can also be switched off indirectly, for instance by switching off the supply after detection of impedance variation between the contact parts. Instead of a substantially resistive impedance, an impedance of which the variations are substantially capacitive or inductive can be used.

The invention also relates to a wing mirror unit and to a method for adjusting a mirror housing of a motor vehicle.

Further embodiments of the invention are embodied in the appended claims.

BRIEF DESCRIPTION OF THE DRAWINGS

Aspects and embodiments of the invention will be further elucidated with reference to the exemplary embodiments represented in the drawings. In the drawings.

The Figures are only schematic representations of embodiments of the invention. In the Figures, identical or corresponding parts are indicated with the same reference numerals.

DETAILED DESCRIPTION

Figure 1:
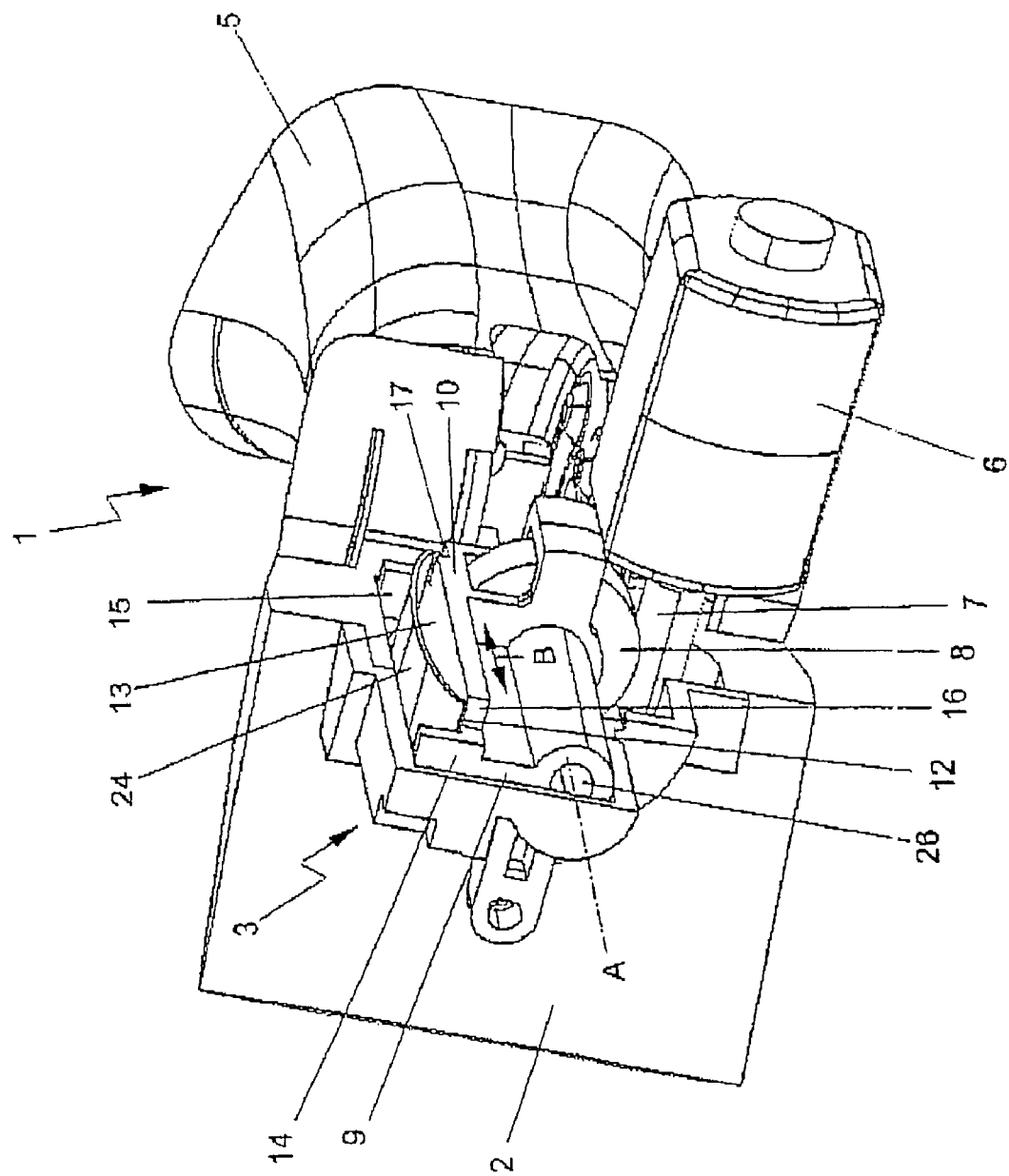
FIG. 1 shows a perspective, schematic view of a mirror adjustment mechanism according to an embodiment of the invention.
Figure 2:
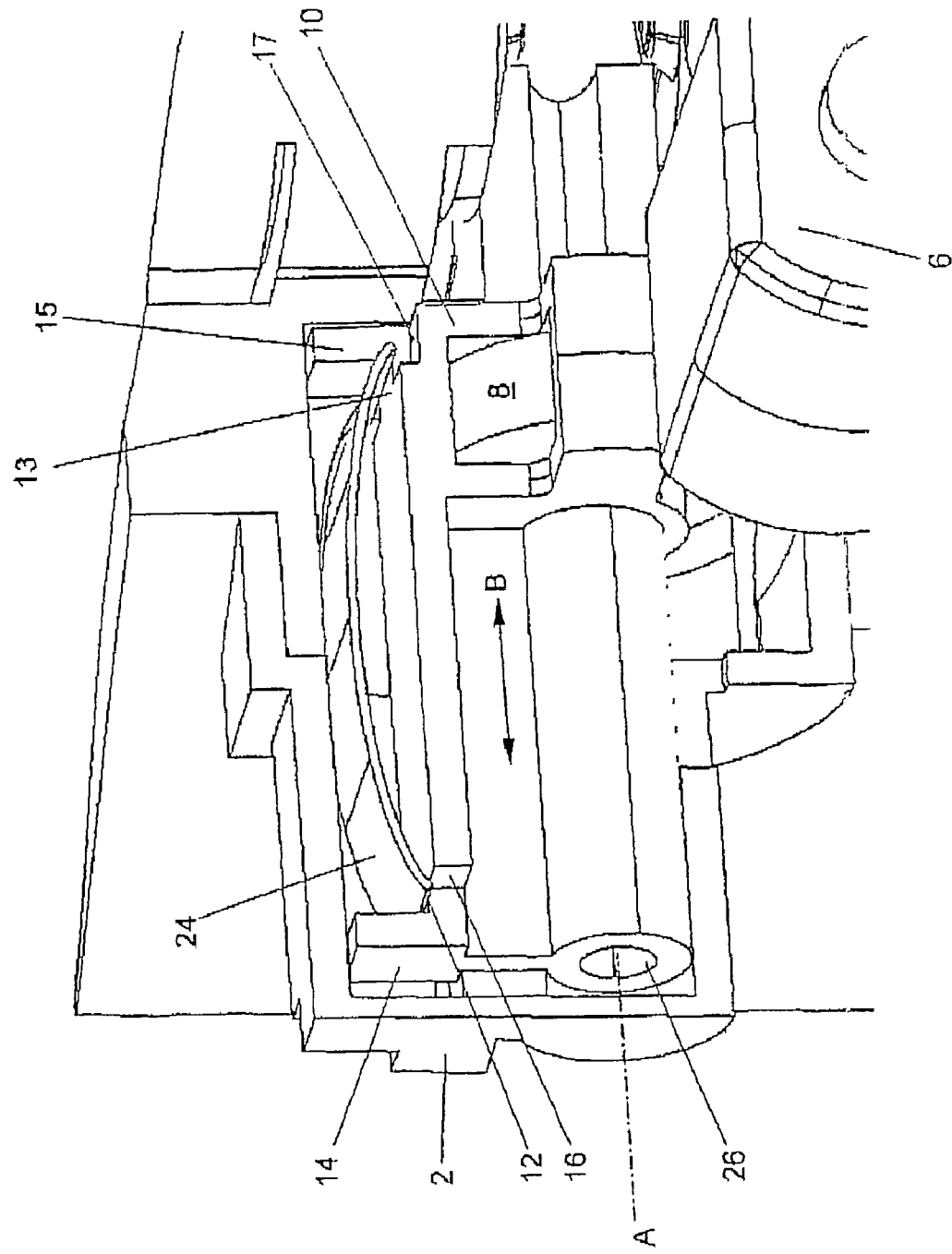
FIG. 2 shows a perspective, schematic view of the mirror adjustment mechanism of FIG. 1 in partly cutaway condition.
Figure 3:
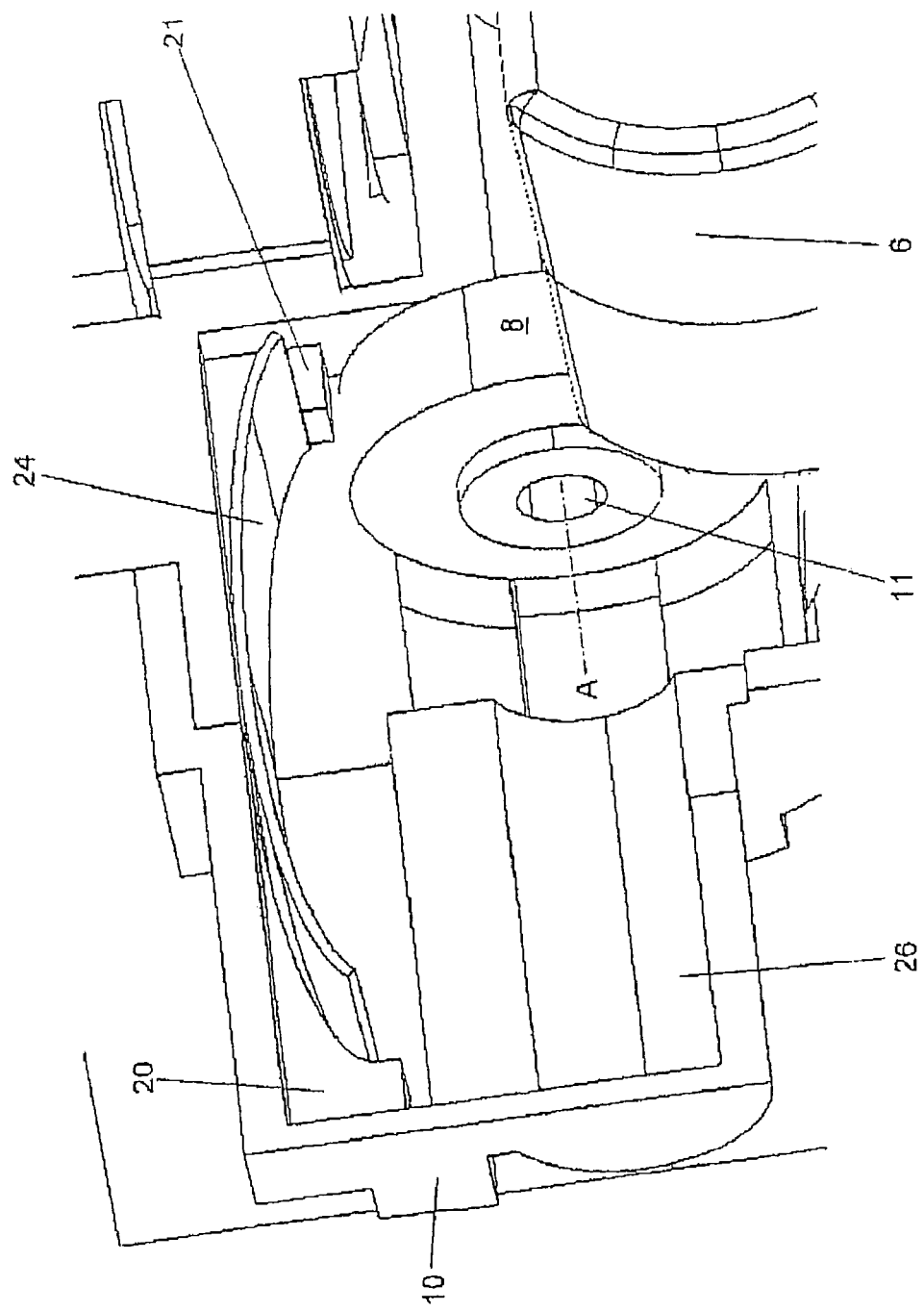
FIG. 3 shows a perspective, schematic view of the mirror adjustment mechanism of FIG. 1 in a still further cutaway condition.
Figure 4:
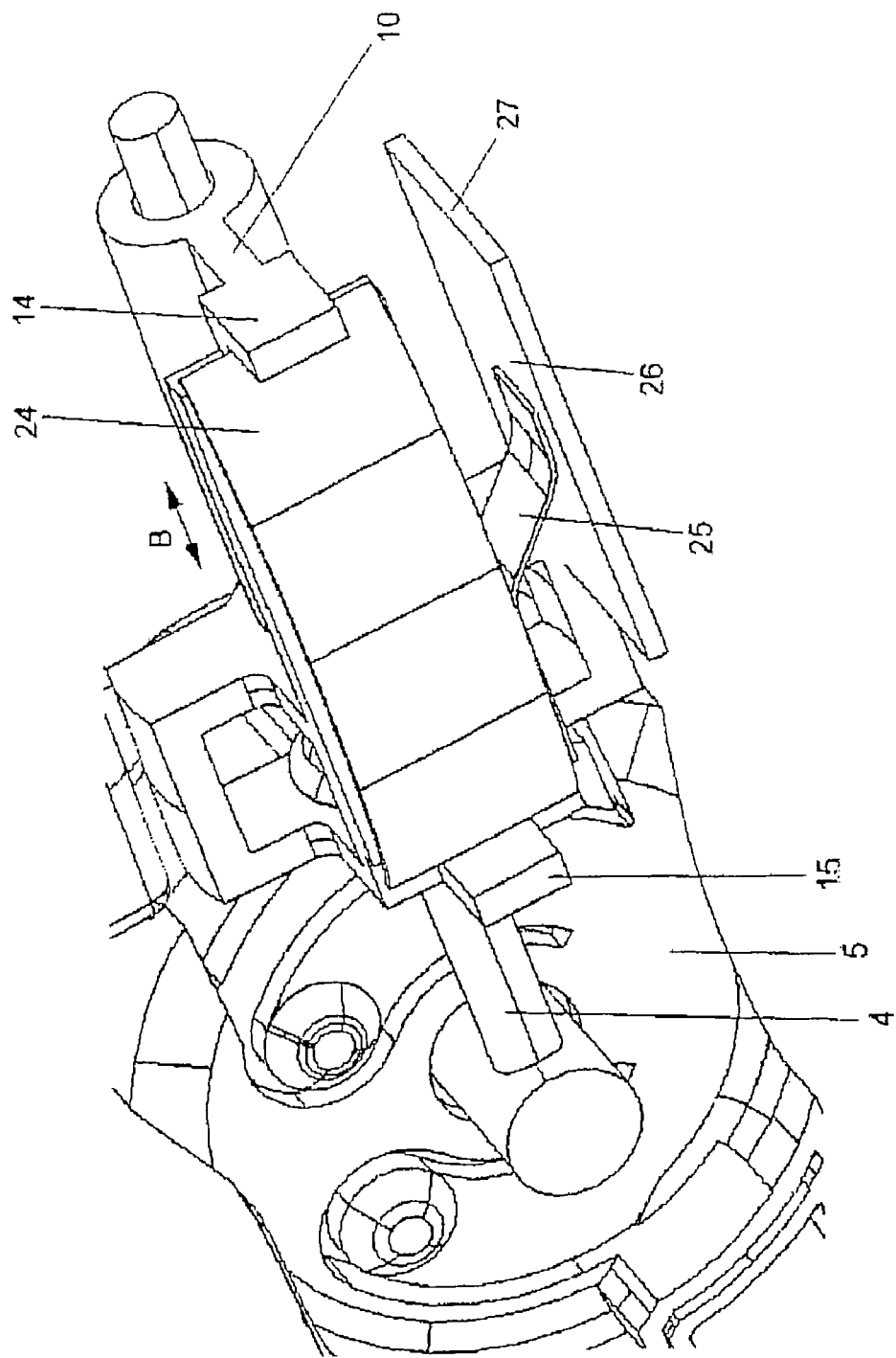
FIG. 4 shows a second perspective view of the mirror adjustment mechanism of FIG. 1.
Figure 5:
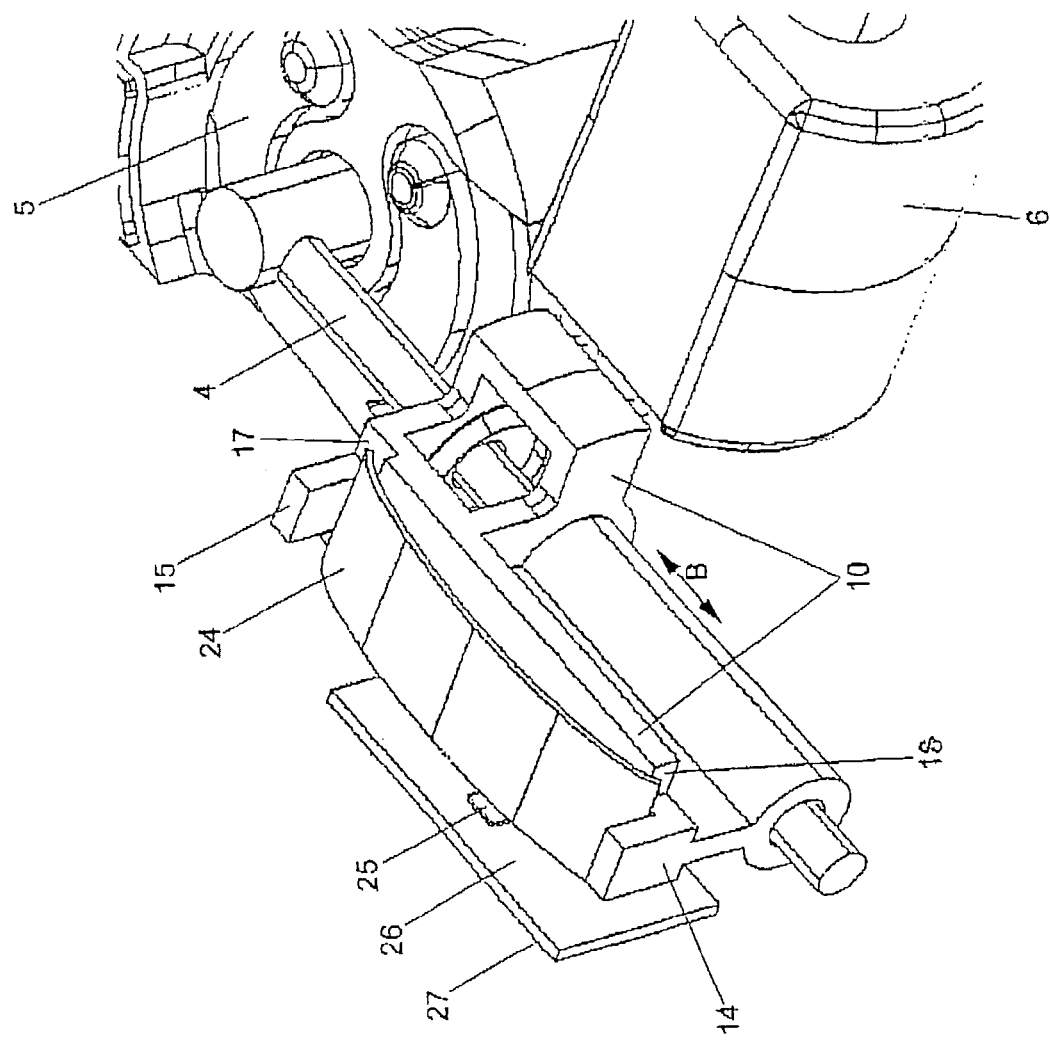
FIG. 5 shows a third perspective view of the mirror adjustment mechanism of FIG. 1.

FIGS. 1-5 shows various perspective schematic views of an embodiment of a mirror adjustment mechanism 1 for adjusting a mirror housing 5 of a motor vehicle. FIG. 1 shows a view of the entire mirror adjustment mechanism 1. FIGS. 2 and 3 show details of the mechanism in a cutaway condition. FIGS. 4 and 5 show the mirror adjustment mechanism 1 in other perspective views.

The mirror adjustment mechanism 1 has an actuator housing 2 in which a drive train 3 is arranged. An output part 4 of the drive train 3 is coupled to a driven part which is integrated with the mirror housing 5. The actuator housing 2 may have a rigid structure and can for instance be built into a door of the motor vehicle. In the embodiment shown, the output part 4 of the drive train 3 is designed as a screw spindle 4, also called plunger, which moves substantially along a straight line, as is shown more clearly in FIGS. 4 and 5. Through the coupling of the screw spindle 4 to the mirror housing 5, the mirror housing 5 is adjusted during movement of the screw spindle 4. The screw spindle 4 is secured against rotation about the longitudinal axis. However, it is not required to design the output part as a screw spindle. In a different embodiment, the output part can, for instance, be designed as a rack which inherently entails fewer energetic losses and gives the designer more freedom of form.

Further, the mirror adjustment mechanism 1 has an electric motor 6 which, via drive train 3, provides an adjustment of the mirror housing 5. To that end, an output shaft of the electric motor 6, in the embodiment shown designed as a worm 7, is coupled to an input part of the drive train 3, for example, a driving element designed as a worm wheel 8 (e.g., see FIGS. 1 and 2). The output shaft of the electric motor 6 and the input part of the drive train 3 can naturally be coupled to each other in different manners as well, for instance with the aid of gear wheels. The electric motor 6 and the drive train 3 together form a drive mechanism.

The worm wheel 8 can be rotatably bearing mounted in a slide 9. Slide 9 is slidable relative to the actuator housing 2 under spring action. The worm wheel 8 and the slide 9 together form a driving part. As a driving element, the worm wheel 8 further drives the screw spindle 4. In the embodiment shown, centrally in the worm wheel 8, an opening 11 with an internal thread is provided. The internal thread corresponds to an external thread on the screw spindle 4, so that during normal operation, upon rotation of the worm wheel, the screw spindle is moved forwards or backwards, since rotation of the screw spindle 4 is prevented. Naturally, the coupling between the worm wheel and the screw spindle can also be realized in other ways, for instance with an additional shaft and gear wheel. Preferably, in slide 9, at the location of the shaft of the worm wheel 8, openings 26 have been provided (see e.g., FIGS. 1-3), so that the screw spindle 4 extends not only through the worm wheel 8 but also through the slide 9. As a result, the slide may also form or provide a guide for the screw spindle.

The parts of the slide 9 by which the worm wheel 8 is rotatably bearing-mounted on opposite sides can be connected to each other via a plate-shaped part 10 which is movable relative to the actuator housing 2 in a direction B which is substantially parallel to the geometrical axis A of the worm wheel 8. To that end, the plate-shaped part 10 may include two substantially parallel, opposed sides 12, 13, with raised edges 14,15 formed on the opposed sides 12,13. On both sides of each raised edge, four recesses have been provided in the plate-shaped part 10, two recesses 16,17 of which are well visible in FIGS. 1 and 2. The recesses correspond with four projections, arranged next to the plate shaped part 10 and fixed with respect to the actuator housing 2, two projections 20,21 of which are shown in FIG. 3, in which the actuator housing 2 is not shown.

Between the raised edges 14,15 and the projections 20,21, a bent, biased leaf spring 24 is provided. The bias is realized by successively bending the leaf spring 24 slightly, so that extremities of the spring fit in an intermediate space between the projections 20,21, positioning the leaf spring 24 between the projections 20,21, and then releasing the leaf spring 24. In the first position of slide 9, the leaf spring 24 is confined at the opposed sides 12,13 between the raised edges 14,15 and the projections 20,21. Further, the slide is provided with at least one first electrical contact part 25, which cooperates with a second, corresponding contact part 26 fixedly arranged relative to the actuator housing 5. In the embodiment shown in FIGS. 4 and 5, the first electrical contact part 25 comprises a sliding contact which moves relative to a circuit board 27 on which the second contact part 26 has been provided. An example of the operation of the arrangement will be further elucidated herein below.

When the electric motor 6 successively drives the worm 7, worm wheel 8 and screw spindle 4, the mirror housing 5 will adjust in a desired direction. When reaching an end position or an intermediate position in which the mirror housing 5 is blocked by external forces, a further movement of the screw spindle 4 is no longer possible. The driving part, that is, the worm wheel 8 inclusive of slide 9, will now move in a direction B which is opposite to the direction of movement of the screw spindle 4. Due to the movement of the slide 9, a pair of projections, for instance the left-hand pair 20, fill up the corresponding recesses 16, so that the leaf spring 24 in the second, displaced position of the slide 9 is now confined on one side 12 of the plate-shaped part 10 by projections 20 which fill up the recesses 16, and on the other side 13 of the plate-shaped part 10 by the raised edge 17. What can be achieved by using a bent leaf spring 24 is that the spring force remains virtually constant upon a slight displacement of the ends relative to each other. Moreover, in this manner, only one spring element is required, counteracting movements of the slide 9 in two opposite directions. The mirror housing 5 has been fixed through the spring action of the leaf spring 24, so that vibrations are prevented.

More in general, it is noted that by the use of a spring element that is arranged parallel relative to the movable driving part and the actuator housing, a construction may be obtained in which the movable driving part is arranged stably and moves only if the load on the drive train as a result of the blocking of the mirror housing reaches a value which exceeds the spring force of the biased spring element. In this way, undue wear of the mechanism is prevented.

Since the sliding movement of the slide 9 amounts to just about a few millimeters, the coupling of the worm 7 and the worm wheel 8 is not mechanically interrupted in the second position of the slide 9. The width of the worm wheel 8 is dimensioned such that the contact with the worm 7 is not interrupted.

In the present application, spring action is understood to mean the exertion of spring force by an elastically deformable element. The elastically deformable element can be, for instance, a spring, but may also be or include a resilient element, such as a small block of elastomeric material.

When activating the electric motor 6 in the opposite direction, the worm wheel 8, inclusive of the slide, will move from the second position back to the first position before a displacement of the screw spindle 4 and hence adjustment of the mirror housing 5 takes place.

During movement of the slide 9, the impedance between the two contact parts 25,26 varies. For instance, and without limitation, in the first position of the slide 9, the contact parts 25,26 can conduct electrically because the contact parts 25,26 touch each other by their extreme surfaces, resulting in a low ohmic impedance, while in the second position of the slide, the electrical connection between the two contact parts 25,26 is broken because the contact parts 25,26 no longer touch each other, resulting in an open pair of terminals with a high-ohmic impedance. In this manner, the impedance between the two contact parts 25, 26 changes during movement of the driving part from the first position to the second position. By positioning the contact parts 25,26 in a suitable manner, the low-ohmic and high-ohmic impedance can also be realized in the second and the first position of the driving part, respectively.

By having the electrical connection between an electrical supply, for instance a battery, and the electric motor 6 proceed via the two contact parts 24,25 and the circuit, the supply is interrupted when the mirror housing reaches an end position, so that the motor 6 switches off and further pivoting of the mirror housing is not forced and the motor is saved. Thus, the electric motor 6 is switched on and off by the slide 9 functioning as a switch and which is adjustable between a position in which an electrical contact is established between the electric motor 6 and the supply, and another position in which the electrical contact is broken.

In a different embodiment according to the invention, not the supply but a separate control circuit is led via the contact parts 25,26. By detecting the impedance variation, the control circuit can switch the supply 27 of the electric motor 6 on or off. The impedance variation can be a resistive variation, as described hereinabove, but can also be capacitive or inductive.

Figure 6:
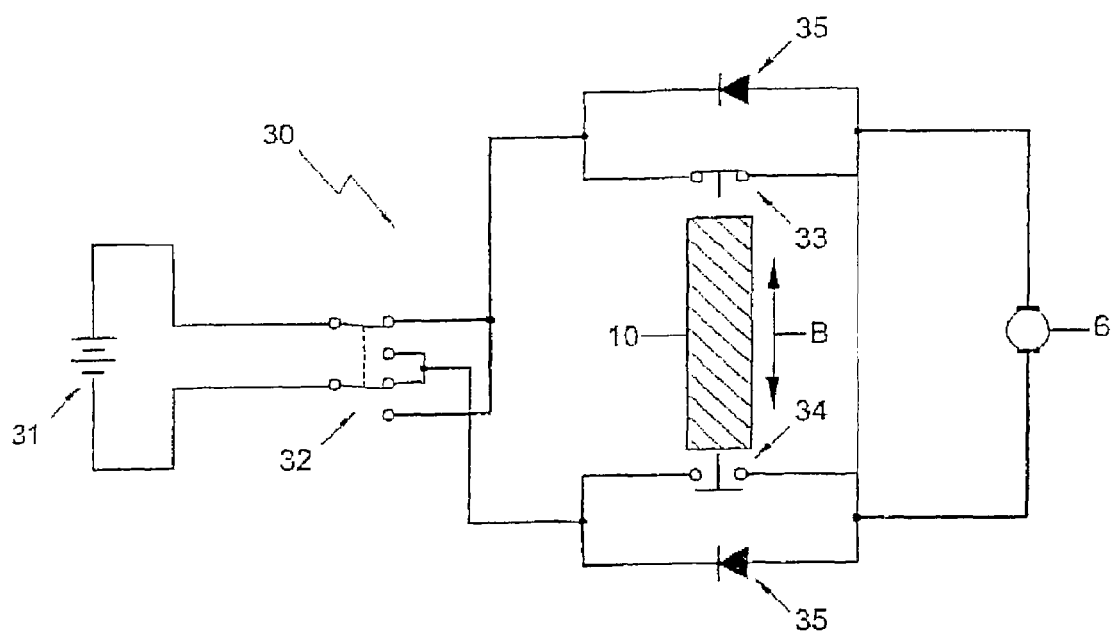
FIG. 6 shows an electrical diagram for an electric motor of the mirror adjustment mechanism of FIG. 1.

Further, the slide 9 can be provided with more than one pair of contact parts 25,26, as represented in FIG. 6, in which an electrical diagram 30 is represented in which the supply 31, for instance the battery of the motor vehicle, is connected via a reversing switch 32 and the two pairs of contact parts 33,34 to the electric motor 6. Connected parallel to the pairs of contact parts 33,34 are diodes 35 having the same direction to enable an earth current of the electric motor 6 when the supply is switched through. With the aid of the diagram 30 it is possible to energize the electric motor 6 of the actuator alternately in opposite directions. By operating the reversing switch 32, the direction of the electrical current can be reversed, so that the polarity of the electric motor is reversed. The diodes 35 then guarantee the earth current of the electric motor 6.

The invention is not limited to the exemplary embodiments described here. Many variants are possible.

For instance, the first contact part 25 can be provided on the slide 9, but also on worm wheel 8, for instance as a ring-shaped electrode, which corresponds to a second contact part designed as a sliding contact.

Instead of being fitted in the door of the motor vehicle, the actuator housing can also be arranged in the mirror housing. The driven part then can cooperate with parts fixedly connected to the bodywork, so that a movement of the output part of the drive train results in a pivotal movement of the mirror housing.

In another embodiment, a spring action can be generated by a different type of spring, for instance by two coil springs, or by a different kind of elastically deforming element.

In a still further embodiment of the adjustment mechanism, the worm wheel may be confined in the sliding direction B by two slides which are under spring action and are optionally not connected directly with other. One spring then exerts a spring action on the first slide, while a second spring exerts a spring force in opposite direction on a second slide.

Also possible is the use of a spring action on the slide and/or the worm wheel in just one direction, so that the electric motor can be switched off when the mirror housing is blocked in a particular direction.

Such variants will be clear to the skilled person and are understood to fall within the scope of the invention as set forth in the following claims.

What is claimed is:

1. A mirror adjustment mechanism for adjusting a mirror housing of a motor vehicle, comprising: an actuator housing and a drive mechanism arranged in the actuator housing, the drive mechanism including:
   an electric motor including an output shaft;
   a drive train having an input part coupled to the output shaft and an output part coupled to a driven part, the driven part being configured to be integrated with said mirror housing such that the output part of the drive train is configured to provide pivotal movement of said mirror housing; and
   a driving part connected to an electrical circuit, the driving part is configured to be movable under a spring action relative to the actuator housing;
   wherein the driving part controls the electric motor and includes at least a first contact part that cooperates with at least a second contact part that is fixedly arranged relative to the actuator housing and is connected to the electrical circuit, and further wherein the driving part is movable between a first position in which the impedance between the first and second contact parts has a first value, and a second position in which the impedance between the first and second contact parts has a second value; the impedance between the electrical circuit and the first contact part varies during movement of the driving part; and the mechanism is configured so that through variation of the electrical impedance, the electric motor is switched off without performing additional switching operations.

2. The mirror adjustment mechanism according to claim 1, wherein the driving part is attached or connected to the actuator housing via at least one spring element.

3. The mirror adjustment mechanism according to claim 2, wherein the spring element includes an elastically deformable element.

4. The mirror adjustment mechanism according to claim 3, wherein the spring element comprises, a leaf spring, one or more coil springs, or an elastomeric material.

5. The mirror adjustment mechanism according claim 1, wherein the driving part comprises a slide that cooperates with a driving element.

6. The mirror adjustment mechanism according to claim 5, wherein the slide is movable along a guide path.

7. A mirror adjustment mechanism for adjusting a mirror housing of a motor vehicle, comprising: an actuator housing and a drive mechanism arranged in the actuator housing, the drive mechanism including;
   an electric motor including an output shaft;
   a drive train having an input part coupled to the output shaft and an output part coupled to a driven part; and
   a driving part connected to an electrical circuit, the driving part is configured to be movable under a spring action relative to the actuator housing;
   wherein the driving part controls the electric motor and includes at least a first contact part that cooperates with at least a second contact part that is fixedly arranged relative to the actuator housing and is connected to the electrical circuit, and further wherein the driving part is movable between a first position in which the impedance between the first and second contact parts has a first value, and a second position in which the impedance between the first and second contact parts has a second value; wherein the driving part comprises a slide that cooperates with a driving element and the slide includes openings, and the output part of the drive train extends through one or more openings.

8. The mirror adjustment mechanism according to claim 5, wherein the driving element is rotatably bearing-mounted in the slide.

9. The mirror adjustment mechanism according to claim 8, wherein the driving element comprises a worm wheel and the input part of the drive train comprises a worm.

10. The mirror adjustment mechanism according to claim 8, wherein the driving element includes a centrally-located opening and the output part of the drive train extends through the opening and drives the output part.

11. The mirror adjustment mechanism according to claim 10, wherein the driving element includes a means for mating screw threads.

12. A mirror adjustment mechanism for adjusting a mirror housing of a motor vehicle, comprising: an actuator housing and a drive mechanism arranged in the actuator housing, the drive mechanism including:
   an electric motor including an output shaft;
   a drive train having an input part coupled to the output shaft and an output part coupled to a driven part; and
   a driving part connected to an electrical circuit, the driving part is configured to be movable under a spring action relative to the actuator housing;
   wherein the driving part controls the electric motor and includes at least a first contact part that cooperates with at least a second contact part that is fixedly arranged relative to the actuator housing and is connected to the electrical circuit, and further wherein the driving part is movable between a first position in which the impedance between the first and second contact parts has a first value, and a second position in which the impedance between the first and second contact parts has a second value, the output part comprises a rack.

13. The mirror adjustment mechanism according to claim 1, wherein the first and second contact parts in the first position form an electrical connection with a low impedance, and in the second position form an open pair of terminals with a high impedance.

14. The mirror adjustment mechanism according to claim 1, wherein the driving part is included in the drive train.

15. The mirror adjustment mechanism according to claim 1, wherein the driving part comprises a slide that cooperates with a driving element, and the slide includes more than one pair of contact parts.

16. The mirror adjustment mechanism according to claim 1, wherein the mechanism includes a reversing switch.

17. The mirror adjustment mechanism according to claim 1, including a separate control circuit, wherein the separate control circuit detects impedance variation associated with the first and second contact parts and controls the electric power supply associated with the electric motor.

18. The mirror adjustment mechanism according to claim 17, wherein the separate control circuit is configured to turn the electric motor on or off.

19. A wing mirror unit for a motor vehicle, comprising:
   a mirror housing;
   a mirror adjustment mechanism for adjusting the mirror housing, the mirror adjustment mechanism comprising an actuator housing and a drive mechanism arranged in the actuator housing, the drive mechanism including:
   an electric motor including an output shaft;
   a drive train having an input part coupled to the output shaft and an output part coupled to a driven part; and
   a driving part connected to an electrical circuit, the driving part is configured to be movable under a spring action relative to the actuator housing;
   wherein the driving part controls the electric motor and includes at least a first contact part that cooperates with at least a second contact part that is fixedly arranged relative to the actuator housing and is connected to the electrical circuit; the driving part is movable between a first position in which the impedance between the first and second contact parts has a first value, and a second position in which the impedance between the first and second contact parts has a second value; and the electric motor is switched off when said mirror housing reaches an end position.

* * * * *